United States Patent
Ikeda

(10) Patent No.: US 8,233,454 B2
(45) Date of Patent: Jul. 31, 2012

(54) COMMUNICATION SYSTEM AND METHOD FOR SWITCHING BETWEEN WIRELESS CONNECTIONS

(75) Inventor: Nobuhiro Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 439 days.

(21) Appl. No.: 12/510,971

(22) Filed: Jul. 28, 2009

(65) Prior Publication Data

US 2010/0027459 A1   Feb. 4, 2010

(30) Foreign Application Priority Data

Jul. 31, 2008   (JP) ................................. 2008-197967

(51) Int. Cl.
    *H04W 4/00* (2009.01)
(52) U.S. Cl. ...................... 370/331; 370/310.2; 370/328; 370/338; 370/349; 370/395.54; 455/438; 455/439; 455/442; 455/443; 455/444; 709/225; 709/226; 709/239; 709/244
(58) Field of Classification Search ............... 370/310.2, 370/328–339, 349, 395.54; 455/422.1, 436–439, 455/442–444; 709/220–226, 238–244
    See application file for complete search history.

(56) References Cited

U.S. PATENT DOCUMENTS

| | | | |
|---|---|---|---|
| 7,516,487 B1 * | 4/2009 | Szeto et al. ..................... 726/22 |
| 7,969,937 B2 * | 6/2011 | Iyer et al. ....................... 370/329 |
| 2002/0193116 A1 * | 12/2002 | Agrawal et al. ............... 455/445 |
| 2004/0063455 A1 * | 4/2004 | Eran et al. ...................... 455/525 |
| 2004/0097232 A1 * | 5/2004 | Haverinen ..................... 455/436 |
| 2005/0054326 A1 * | 3/2005 | Rogers .......................... 455/410 |
| 2006/0245404 A1 * | 11/2006 | Bajic ............................. 370/338 |
| 2007/0047480 A1 | 3/2007 | Suga |
| 2007/0091842 A1 * | 4/2007 | Siddiqi et al. ................. 370/331 |
| 2007/0097919 A1 * | 5/2007 | Tsubota ......................... 370/331 |
| 2007/0153741 A1 * | 7/2007 | Blanchette et al. ........... 370/331 |
| 2007/0255834 A1 * | 11/2007 | Abhishek et al. ............. 709/226 |
| 2008/0316982 A1 * | 12/2008 | Murty et al. .................. 370/338 |

FOREIGN PATENT DOCUMENTS

| | | |
|---|---|---|
| JP | 2000-059380 A | 2/2000 |
| JP | 2003-198558 A | 7/2003 |

OTHER PUBLICATIONS

Garcia et al., Load Balancing in WLANs through IEEE 802.11k Mechanisms, 2006, Proceedings of the 11th IEEE Symposium on Computers and Communications (ISCC'06).*
Habets, arping, Jun. 21, 2003, www.habets.pp.se/synscan/docs/arping.8.html.*

* cited by examiner

*Primary Examiner* — Hoon J Chung
(74) *Attorney, Agent, or Firm* — Carter, DeLuca, Farrell & Schmidt LLP

(57) ABSTRACT

A management apparatus instructs a wireless terminal wirelessly connecting to a first base station to switch wireless connection to a second base station. After the wireless terminal switches the wireless connection to the second base station as instructed, the wireless terminal transmits a message for updating information used for determining a forwarding destination of the message received by the relay apparatus. The relay apparatus updates the information used for determining the forwarding destination of the received message based on the message transmitted from the wireless terminal.

13 Claims, 10 Drawing Sheets

COMMUNICATION SYSTEM AND METHOD FOR SWITCHING BETWEEN WIRELESS CONNECTIONS

BACKGROUND OF THE INVENTION

1. Field of the Invention

The present invention relates to a communication system including a wireless terminal, a plurality of base stations capable of wireless communication with the wireless terminal, a management apparatus, and a relay apparatus for relaying communication between the plurality of base stations and the management apparatus, and a method for controlling the communication system.

2. Description of the Related Art

In recent years, along with a prevailing 802.11 wireless local area network (LAN) (hereinafter, referred to as a wireless LAN), home network systems capable of a stream communication of video data via the wireless LAN has being developed.

U.S. Patent Application Publication No. US 2007/0047480 discusses a management apparatus that manages wireless resources used by a plurality of access point apparatuses. The management apparatus discussed in U.S. Patent Application Publication No. US 2007/0047480 designates an access point apparatus to be connected for a wireless terminal according to usage of the wireless resource by each access point apparatus. For example, when the wireless resources of the first access point apparatus to which the wireless terminal is connected are exhausted, the management apparatus instructs the wireless terminal to switch connection to a second access point apparatus having spare wireless resources. The wireless terminal switches the connection to the second access point apparatus according to the instruction from the management apparatus and continues wireless communication. As described above, the management apparatus is provided in a network so that each wireless terminal can perform a stream communication using a suitable wireless resource in the system.

Further, Japanese Patent Application Laid-Open Nos. 2000-059380 and 2003-198558 discuss a method for managing an Internet Protocol (IP) address and a Media Access Control (MAC) address of a wireless terminal when an access point apparatus to be connected to the wireless terminal is switched in response to the movement of the wireless terminal.

Consider a case where a management apparatus that manages wireless resources of a plurality of access point (base station) apparatuses is connected to the plurality of access point apparatuses via a bridge. Two wireless terminals performing a stream communication via the first access point apparatus switch connection to the second access point apparatus according to an instruction from the management apparatus. In this case, the two wireless terminals can continue the stream communication via the second access point apparatus.

On the other hand, an IP message from the management apparatus to the wireless terminals, which have switched the connection destination to the second access point apparatus, may not reach the wireless terminals. This is because a forwarding table, which is managed by the bridge, is not updated and, thus, the bridge, which has received the IP message from the management apparatus, forwards the IP message to the first access point apparatus, to which the wireless terminals have been connected earlier. As a result, the wireless terminals cannot receive an important control message from the management apparatus.

SUMMARY OF THE INVENTION

According to an aspect of the present invention, a communication system includes a wireless terminal, a plurality of base stations capable of wireless communication with the wireless terminal, a management apparatus, and a relay apparatus configured to relay communication between the plurality of base stations and the management apparatus. The relay apparatus includes a storage unit configured to store information to be used to determine a forwarding destination of a received message. The management apparatus includes an instruction unit configured to instruct the wireless terminal wirelessly connecting to a first base station to switch wirelessly connecting to a second base station. The wireless terminal includes a switching unit configured to switch the wireless connection to the second base station based on a switching instruction from the switching unit, and a transmission unit configured to transmit a message for the relay apparatus to update information stored by the storage unit after the switching unit completes switching. The relay apparatus further includes an updating unit configured to update information stored by the storage unit based on the message transmitted from the wireless terminal by the transmission unit.

Further features and aspects of the present invention will become apparent from the following detailed description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
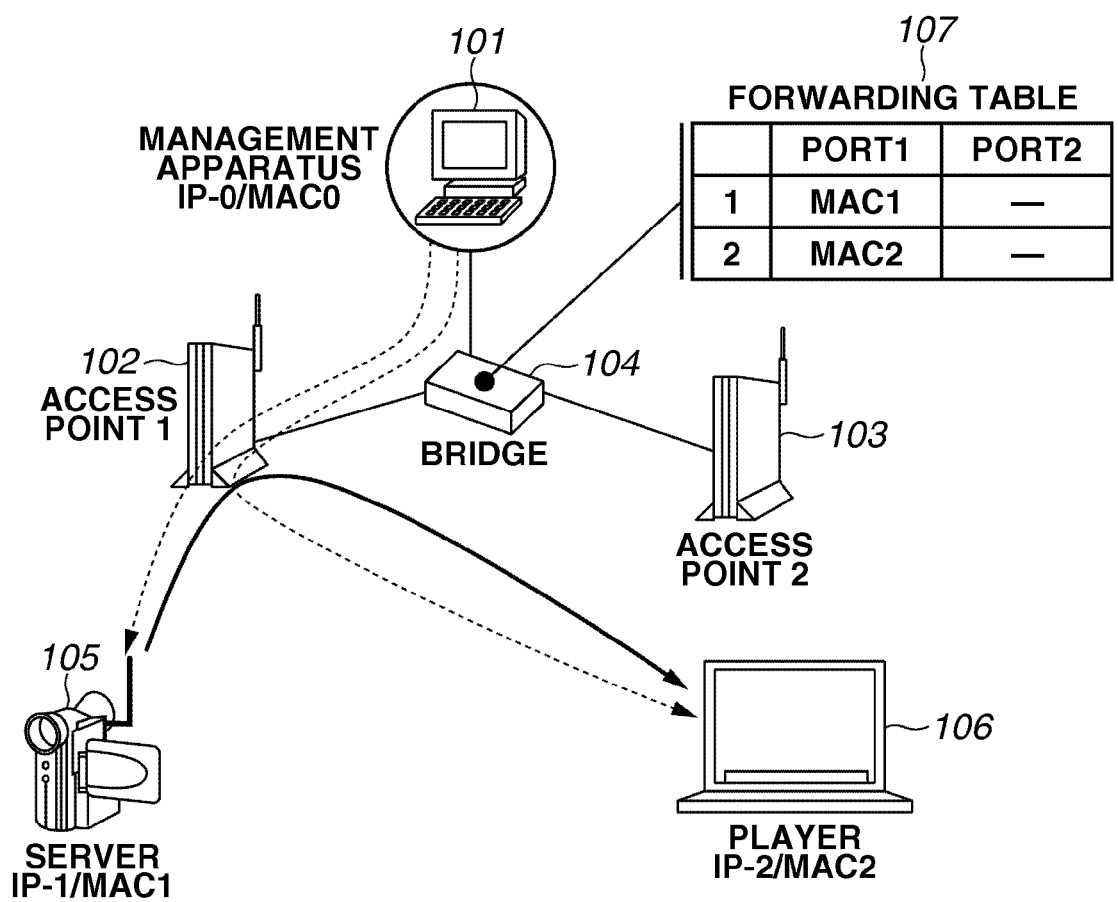
FIG. 1 is a diagram illustrating a configuration of a communication system according to an exemplary embodiment of the present invention.

FIG. 1 illustrates a configuration of a communication system according to an exemplary embodiment of the present invention.

The communication system includes a network resource management apparatus (hereafter referred to as a management apparatus) 101, an access point apparatus (1) 102, an access point apparatus (2) 103, a bridge 104, and wireless terminals 105 and 106. The management apparatus 101 manages information of each access point (base station) apparatus in the communication system and a wireless resource (such as frequency band) used for each access point apparatus.

The bridge 104 is connected to the management apparatus 101, the access point apparatus (1) 102, and the access point apparatus (2) 103, and operates as a relay apparatus for network communication. The management apparatus 101 is connected to a connection port 0 of the bridge 104. The access point apparatus (1) 102 is connected to a connection port 1 of the bridge 104, and the access point apparatus (2) 103 is connected to a connection port 2 of the bridge 104.

The wireless terminals 105 and 106 have a built-in wireless communication function using 802.11 wireless LAN. The wireless terminal 105 is a digital video camera (hereinafter referred to as a DVC), and the wireless terminal 106 is a display.

The DVC 105 and the display 106 can wirelessly communicate via the access point apparatus (1) 102 or the access point apparatus (2) 103. When a moving image is wirelessly transmitted, the DVC 105 operates as a server and the display 106 operates as a player to form a wireless network.

FIG. 1 illustrates the DVC 105 and the display 106 performing the moving image transmission using the access point apparatus (1) 102 as a relay apparatus.

A forwarding table 107, which is managed by the bridge 104, indicates destination information of the network communication registered in the connection ports 1 and 2. The forwarding table 107 is used to determine a forwarding destination of the received message.

Figure 2:
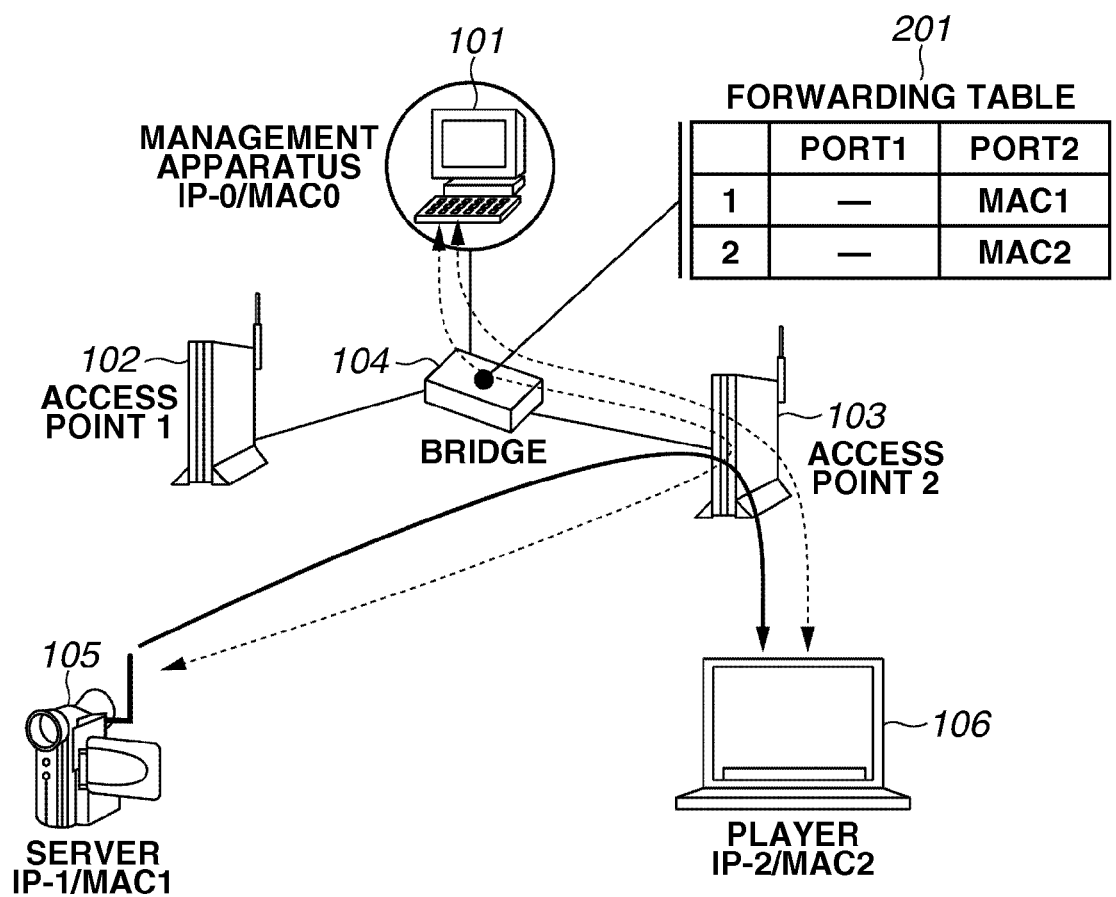
FIG. 2 is a block diagram illustrating a configuration of the communication system after switching of access point apparatuses according to an exemplary embodiment of the present invention.

FIG. 2 illustrates a status of the network in a case where the DVC 105 and the display 106 switch connection to the access point apparatus (2) 103 to perform the moving image transmission.

The forwarding table 201 indicates destination information after the processing according to the present exemplary embodiment is performed.

Figure 6:
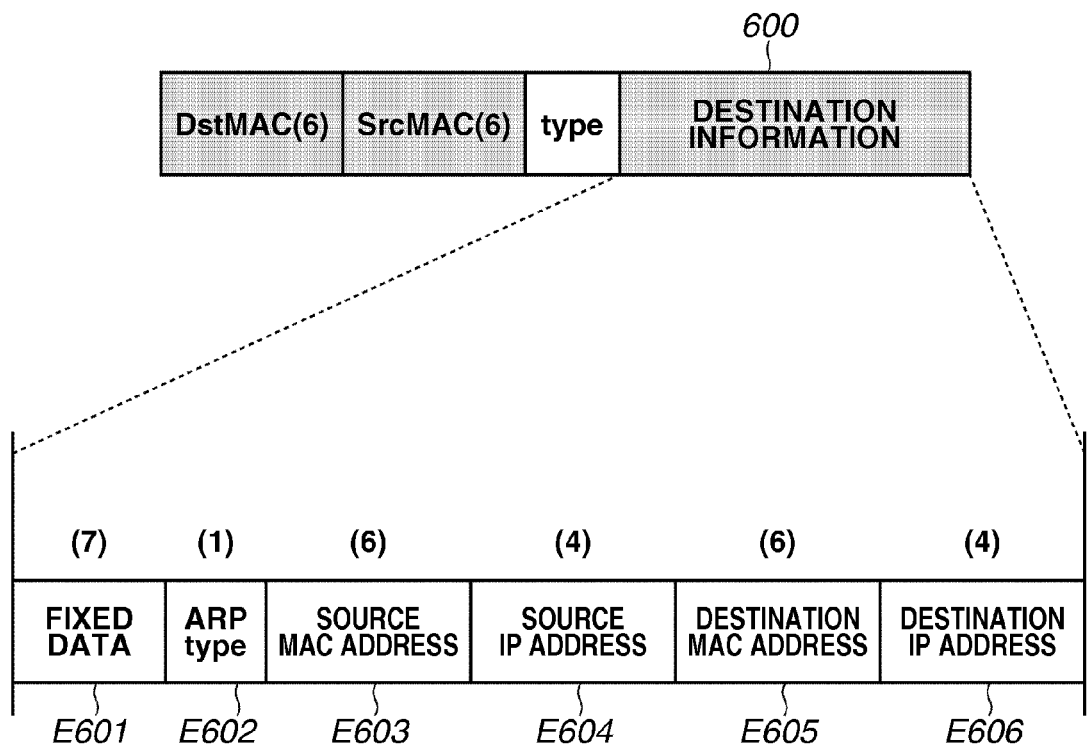
FIG. 6 is a schematic view of a frame format of an Address Resolution Protocol (ARP) message.

FIG. 6 illustrates a schematic diagram of a frame format of an ARP message, which is transmitted and received in the communication system according to the present exemplary embodiment, which schematically expresses information elements necessary for descriptions below.

Therefore, the actual frame to be used is not necessarily the same format but may include other information in addition to the information elements as illustrated FIG. 6. The ARP is a protocol used for acquiring a MAC address from an IP address in a Transmission Control Protocol (TCP)/IP network.

A packet of the ARP message includes a header part and a data part. For the header part, a destination MAC address (DstMAC) and a source MAC address (SrcMAC) of the ARP message are set. As will be described below, since the ARP request message is transmitted in broadcast mode, a broadcast address is set for the destination MAC address of the header part.

FIG. 6 illustrates details of the information elements included in destination information 600 constituting the data part.

For an information element E601, fixed data to be used for the ARP message is set, and for an information element E602, an identification code for identifying a type of the ARP message, such as an ARP request or an ARP response, is set.

For an information element E603, the source MAC address of the ARP message is set, and for an information element E604, the source IP address of the ARP message is set. For an information element E605, the destination MAC address of the ARP message is set, and for an information element E606, the destination IP address of the ARP message is set.

Figure 8:
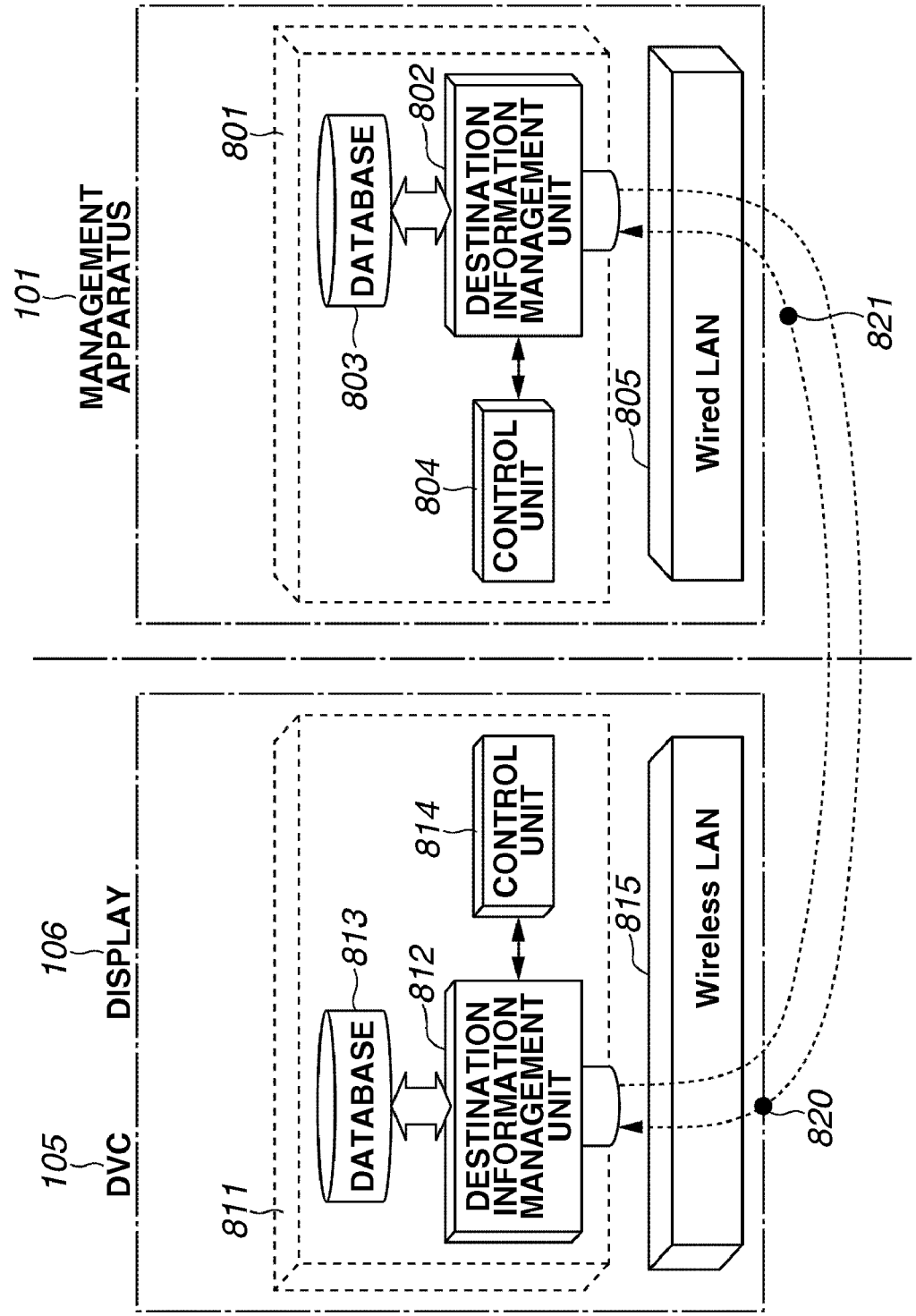
FIG. 8 is a diagram illustrating a block configuration of a network resource management apparatus and a wireless terminal according to an exemplary embodiment of the present invention.

FIG. 8 is a diagram illustrating a block configuration of the management apparatus 101 and the DVC 105 or the display 106 according to the present exemplary embodiment. The DVC 101 and the display 106 have similar block configurations.

The management apparatus 101 includes a middleware module 801 and a wired network control unit 805. The middleware module 801 includes a destination information management unit 802, a database 803, and a control unit 804.

The database 803 stores an ARP table. The ARP table stores the MAC address and the IP address, which are destination information of a message, in association with each other. The control unit 804 controls the whole middleware module 801.

Figure 9:
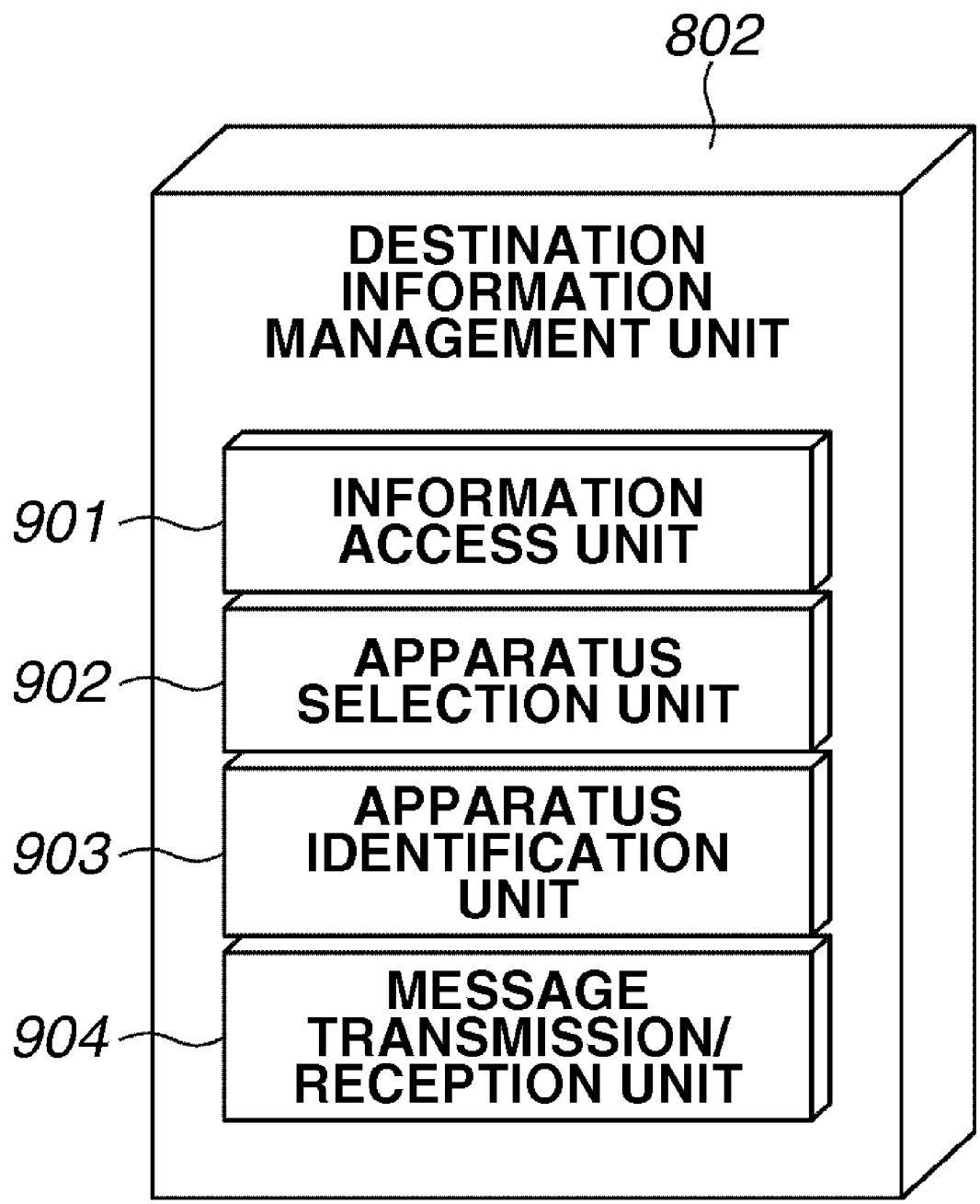
FIG. 9 is a diagram illustrating a block configuration of a network resource management apparatus and a destination information management unit according to an exemplary embodiment of the present invention.

The destination information management unit 802 will be described in detail with reference to FIG. 9.

An information access unit 901 accesses the database 803. An apparatus selection unit 902 selects a destination wireless terminal (wireless terminal that has switched a connection destination access point apparatus) of the ARP request message.

An apparatus identification unit 903 identifies a destination of a received message. A message transmission/reception unit 904 controls transmission/reception of various types of messages.

The DVC 105 or the display 106 illustrated in FIG. 8 includes a middleware module 811 and a wireless network control unit 815.

The middleware module 811 includes a destination information control unit 812, a database 813, and a control unit 814. The database 813 stores an ARP table. The ARP table stores the MAC address and the IP address, which are the destination information of the message, in association with each other. The control unit 814 controls the whole middleware module 811.

Figure 10:
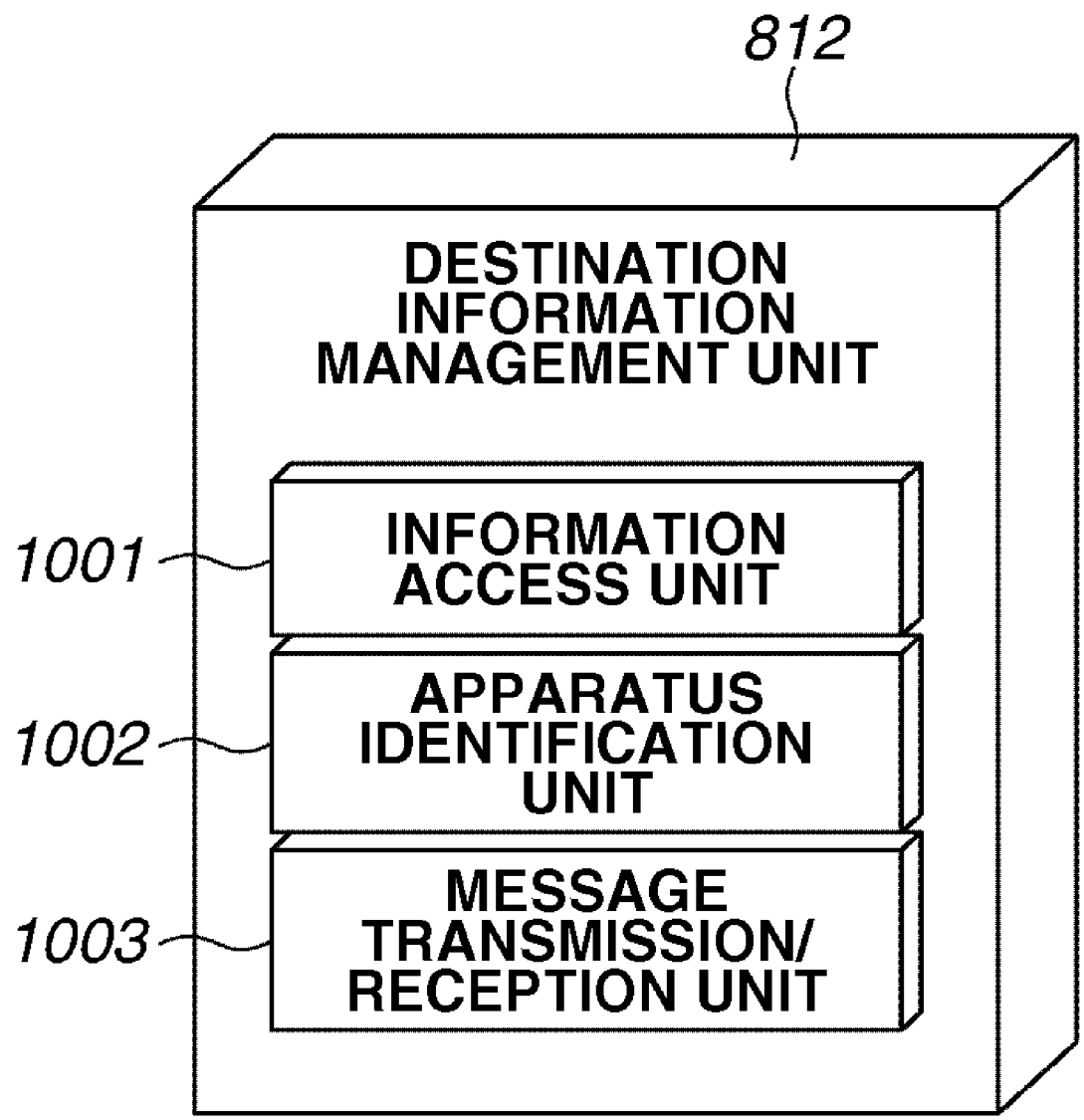
FIG. 10 is a diagram illustrating a block configuration of the destination information management unit of the wireless terminal according to an exemplary embodiment of the present invention.

The destination information control unit 812 will be described in detail with reference to FIG. 10.

An information access 1001 accesses the database 813. An apparatus identification unit 1002 identifies a destination of a received message. A transmission/reception unit 1003 controls transmission/reception of various types of messages.

Message paths 820 and 821 illustrated in FIG. 8 include the access point apparatus (1) 102, the access point apparatus (2) 103, and the bridge 104.

The message path 820 simply represents a path where a message is transmitted from the management apparatus 101 and received by the DVC 105 or the display 106.

The message path 821 simply represents a path where a message is transmitted from the DVC 105 or the display 106 and received by the management apparatus 101.

Figure 3:
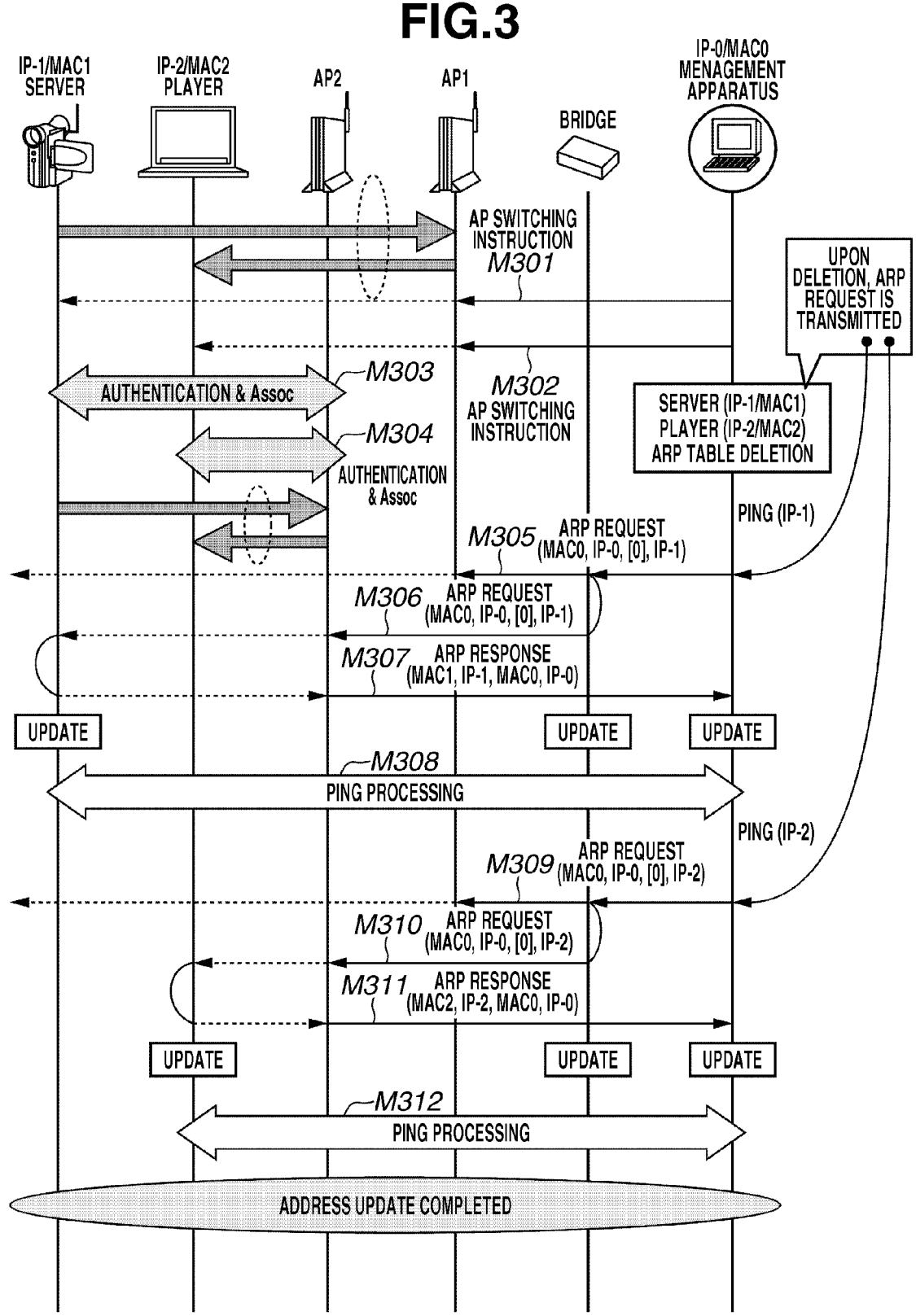
FIG. 3 is a sequence chart illustrating an operation of the communication system according to a first exemplary embodiment of the present invention.
Figure 4:
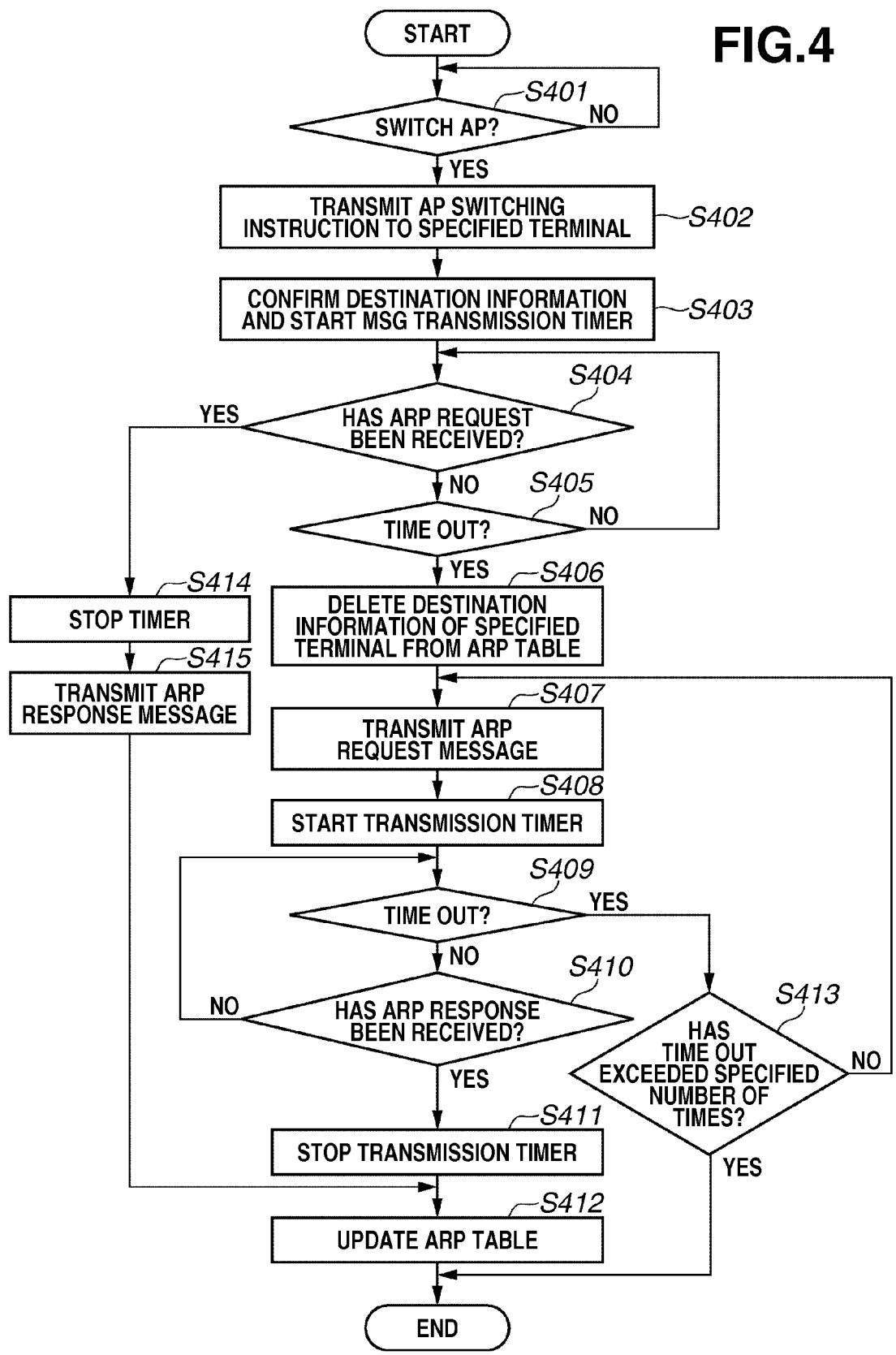
FIG. 4 is a flowchart illustrating an operation of a network resource management apparatus according to an exemplary embodiment of the present invention.
Figure 5:
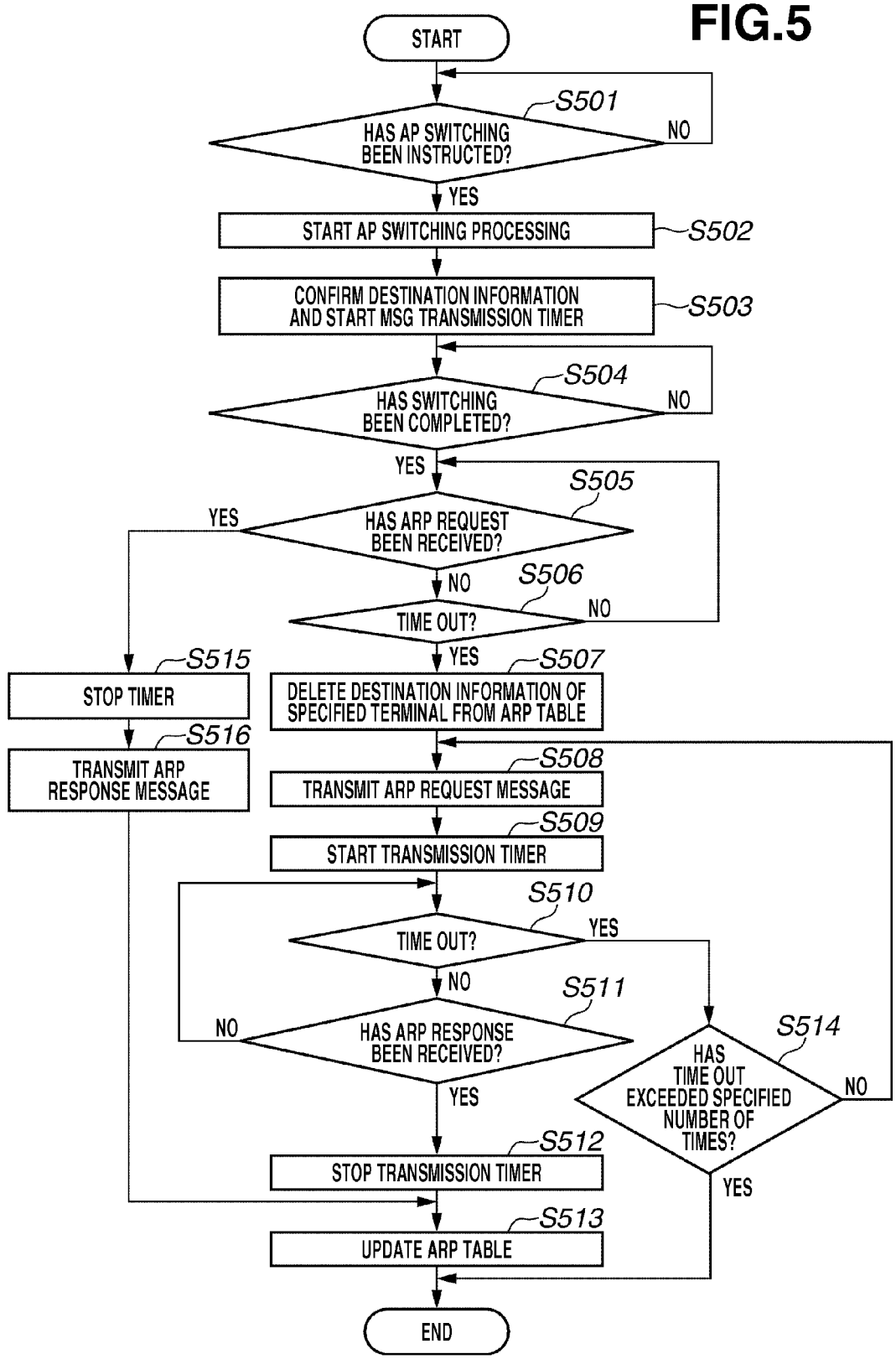
FIG. 5 is a flowchart illustrating an operation of a wireless terminal according to an exemplary embodiment of the present invention.

FIG. 3 is an example of a sequence chart illustrating an operation of the communication system according to a first exemplary embodiment of the present invention. FIG. 4 illustrates a processing flow performed by the management apparatus 101, and FIG. 5 illustrates a processing flow performed by the DVC 105 and the display 106, which are wireless terminals.

Presume that the moving image transmission is being performed between the DVC 105 and the display 106 via the access point apparatus (1) 102, as illustrated in FIG. 1. At this time, the forwarding table managed by the bridge 104 has a content such as that of the table 107 illustrated in FIG. 1.

More specifically, the table 107 indicates that the MAC addresses of the DVC 105 and the display 106, which are wirelessly connected to the access point apparatus (1) 102, are registered in the connection port 1. Since no wireless terminal is connected to the access point apparatus (2) 103, the table 107 indicates that no MAC address is registered in the connection port 2.

When a plurality of wireless terminals (not illustrated) start communication via the access point apparatus (1) 102, thus causing a shortage of the wireless resources in the access point apparatus (1) 102, the management apparatus 101 performs the following processing.

The control unit 804 of the management apparatus 101 confirms a usage state of wireless resources in another access point apparatus that is available in the system. According to the present exemplary embodiment, the control unit 804 confirms the usage state of wireless resources of the access point apparatus (2) 103.

When it is confirmed that there is enough free space in the wireless resources of the access point apparatus (2) 103, the control unit 804 determines to switch the connecting destination of the DVC 105 and the display 106 to the access point apparatus (2) 103 (YES in step S401).

In step S402, the wired network control unit 805 of the management apparatus 101 transmits to the DVC 105 a switching instruction message (M301) for instructing to switch connection to the access point apparatus (2) 103.

Further, similarly, in step S402, the wired network control unit 805 of the management apparatus 101 transmits the switching instruction message (M302) to the display 106.

Next, in step S403, the control unit 804 of the management apparatus 101 starts a timer for destination-information confirmation message transmission managed by each of the DVC 105 and the display 106.

In steps S404 and S405, the control unit 804 of the management apparatus 101 monitors reception of an ARP request message in broadcast mode from the DVC 105 and the display 106 until the timer for destination-information confirmation message transmission times out.

When receiving the switching instruction message (M301) (YES in step S501), then in step S502, the DVC 105 performs connection switching processing on the access point apparatus (2) 103, which is the switching destination.

More specifically, the DVC 105 performs establishment of authentication and association (M303) between the access point apparatus (2) 103 and the DVC 105. Alternatively, the DVC 105 may perform processing for wireless connection to the access point apparatus (2) 103 after canceling authentication and association between the access point apparatus (1) 102 and the DVC 105.

Similarly, when receiving the switching instruction message (M302) (YES in step S501), then in step S502, the display 106 performs the connection switching processing (M304) on the access point apparatus (2) 103.

In step S503, the control unit 814 of the DVC 105 and the display 106 starts a timer for destination-information confirmation message transmission.

When the connection switching processing has been completed (YES in step S504), the moving image transmission continues to be performed between the DVC 105 and the display 106 via the access point apparatus (2) 103.

After completing the connection switching processing, in steps S505 and S506, the control unit 814 of the DVC 105 and the display 106 monitors the reception of the ARP request message in broadcast mode from the management apparatus 101 until the timer for destination-information confirmation message transmission times out.

The management apparatus 101 performs the following processing (M305 to M312) on each of the DVC 105 and the display 106 in order. The processing will be described all together for simplifying the descriptions.

In step S405, when detecting that the timer for destination-information confirmation message transmission has timed out without receiving the ARP request message, the control unit 804 of the management apparatus 101 instructs the destination information management unit 802 to perform the following processing.

The apparatus selection unit 902 of the destination information management unit 802 selects the DVC 105 and the display 106, which have switched the access point apparatus to be connected, as a destination of a Packet Internet Groper (PING) command. PING is a command for confirming communication with a destination having a specified IP address on the network.

The destination information management unit 802 copies the IP addresses of the DVC 105 and the display 106 stored in the ARP table on the database 803 to a temporary region of the database 803 using the information access unit 901.

In step S406, the destination information management unit 802 deletes the MAC addresses and the IP addresses of the DVC 105 and the display 106 stored in the ARP table on the database 803 using the information access unit 901.

Next, the destination information management unit 802 performs the transmission processing on the PING command on which the IP addresses of the DVC 105 and the display 106 that are copied to the temporary region of the database 803 are specified.

The destination information management unit 802 transmits the PING command to the wired network control unit 805 using the message transmission/reception unit 904. Here the IP addresses and the MAC addresses of the DVC 105 and the display 106 are deleted from the referred-to ARP table in step S406.

When the MAC address corresponding to the IP address specified by the PING is not registered in the ARP table, the ARP request message is transmitted in broadcast mode. In step S407, the wired network control unit 805 transmits the ARP request messages (M305, M309) in broadcast mode before performing the PING protocol.

The information elements E602 to E606 set for the destination information 600 constituting the data part of the ARP request message (M305) will be described with reference to FIG. 6. Since the ARP request message is transmitted in broadcast mode, the broadcast address is set for the header part as the destination MAC address.

For the information element E602, an identification code indicating that the type of the ARP message is an ARP request is set. For the information element E603, the MAC address (MAC0) of the management apparatus 101 is set. For the information element E604, the IP address (IP-0) of the management apparatus 101 is set.

For the information element E605, the destination MAC address is set. However, since the destination MAC address is unknown when the ARP request message is transmitted, the MAC address is not set (0 clear). For the information element E606, the IP address (IP-1) of the DVC 105, whose MAC address is inquired, is set.

The information elements E602 to E605 of the destination information 600 of the ARP request message (M309) are the same as the ARP request message (M305). For the information element E606, the IP address (IP-2) of the wireless terminal 106 is set.

After transmitting the ARP request message in step S407, then in step S408, the destination information management unit 802 starts a message transmission timer.

In steps S409 and S410, the destination information management unit 802 monitors the reception of the ARP response message from the DVC 105 and the display 106 until the message transmission timer times out.

Next, the bridge 104, which has received the ARP request message, forwards the ARP request messages (M305, M309) to the access point apparatus (1) 102 connected to the connection port 1. Further, the bridge 104 forwards the ARP request messages (M306, M310) to the access point apparatus (2) 103 connected to the connection port 2.

The access point apparatus (1) 102 connected to the connection port 1 forwards the ARP request messages (M305, M309) to the wireless network under control.

Further, the access point apparatus (2) 103 connected to the connection port 2 forwards the ARP request messages (M306, M310) to the wireless network under control.

When the ARP request messages (M306, M310) pass through the message path 820 and reach the wireless network control unit 815, the DVC 105 and the display 106 perform the following processing.

When the ARP request message is the one addressed to the wireless network control unit 815 itself, the wireless network control unit 815 transfers the ARP request message to the transmission/reception unit 1003 in the destination information control unit 812. Since the destination MAC address set in the header part of the ARP request message is a broadcast address, the wireless network control unit 815 transfers the ARP request message to the transmission/reception unit 1003.

Upon receiving the ARP request message, the transmission/reception unit 1003 of the destination information control unit 812 transfers the destination information 600 of the ARP request message to the apparatus identification unit 1002.

The apparatus identification unit 1002 refers to the IP address thereof stored in the database 813 using the information access unit 1001 and compares the destination IP address information E606 with the IP address thereof.

If the destination IP address information E606 of the ARP request message corresponds to the IP address of the apparatus identification unit 1002 (YES in step S505), then in step S515, the control unit 814 stops the timer for destination-information confirmation message transmission.

Next, the destination information control unit 812 generates the ARP response message (M307, M311) to the management apparatus 101.

The details of the information elements E602 to E606 that are set for the destination information 600 of the ARP response message (M307) will be described below.

For the information element E602, an identification code indicating that the type of the ARP message is an ARP response is set. For the information element E603, the MAC address (MAC1) of the DVC 105 is set. For the information element E604, the IP address (IP-1) of the DVC 105 is set.

For the information element E605, the MAC address (MAC0) of the management apparatus 101 is set. For the information element E606, the IP address (IP-0) of the management apparatus 101 is set.

The ARP response message (M311) has the same destination information 600 as that of the ARP response message (M307) except that the MAC address (MAC2) of the display 106 is set for the information element E603 and the IP address (IP-2) of the display 106 is set for the information element E604.

The destination information control unit 812 transfers a generated ARP response message to the wireless network control unit 815 using the transmission/reception unit 1003.

In step S516, the wireless network control unit 815 transmits the ARP response messages (M307, M311) to the management apparatus 101 via the access point apparatus (2) 103.

In step S513, the destination information control unit 812 updates the ARP table stored in the database 813 using the information access unit 1001.

The access point apparatus (2) 103 forwards the received ARP response messages (M307, M311) to the management apparatus 101 via the bridge 104.

The bridge 104 updates the forwarding table based on the received ARP response messages (M307, M311). The forwarding table 201 illustrated in FIG. 2 is the one updated by the bridge 104. The forwarding table 201 indicates that the DVC 105 and the display 106 switch the connection to the access point apparatus (2) 103, and, thus, the MAC addresses of the DVC 105 and the display 106 are registered in the connection port 2. Further, since the DVC 105 and the display 106, which have been connected to the access point apparatus (1) 102 up until then, are removed, no MAC address is registered in the connection port 1.

When the ARP response messages (M307, M311) reach the wired network control unit 805 via the message path 821, the management apparatus 101 performs the following processing.

When the ARP response messages (M307, M311) are addressed to the wired network control unit 805, the wired network control unit 805 transfers the ARP response message to the message transmission/reception unit 904 of the destination information management unit 802.

The message transmission/reception unit 904 of the destination information management unit 802 transfers the destination information 600 of the ARP response message to the apparatus identification unit 903.

The apparatus identification unit 903 refers to its own IP address stored in the database 803 using the information access unit 901 and compares the destination IP address information E606 with the own IP address.

If the destination IP address information E606 of the ARP response message corresponds to the IP address of the apparatus identification unit 903 (YES in step S410), then in step S411, the destination information management unit 802 stops the message transmission timer.

In step S412, the destination information management unit 802 updates the ARP table stored in the database 803 using the information access unit 901.

After the ARP table is updated, the wired network control unit 805 refers to the ARP table stored in the database 803 using the information access unit 901 and performs PING protocol message processing (M308, M312). At this point of time, since the forwarding table managed by the bridge 104 has been updated, the PING command transmitted by the management apparatus 101 reaches the DVC 105 and the display 106. Then, a response is transmitted back to the management apparatus 101. As a result, the communication of the network can be confirmed between the management apparatus 101 and the DVC 105 and between the management apparatus 101 and the display 106.

If the message transmission timer times out (YES in S409) without receiving the ARP response message having a destination of the management apparatus 101, then in step S413, the management apparatus 101 determines whether the number of times of time out reaches a predetermined number of times. If the number of times of time out is within the specified number (NO in step S413), the processing returns to step S407 to resend the ARP request message. If the number of times of time out reaches the predetermined number (YES in step S413), the processing ends.

According to the sequence of FIG. 3, after the processing (M305, M306, M307, M308) has been performed between the management apparatus 101 and the DVC 105, the processing (M309, M310, M311, M312) is performed between the management apparatus 101 and the display 106. However, whichever processing may be performed first.

As described above, according to the present exemplary embodiment, the management apparatus 101 transmits the ARP request message in broadcast mode after instructing the wireless terminal to switch the connecting destination of the access point apparatus. At the point when the wireless terminal switches the connecting destination of the access point apparatus, the forwarding table managed by the bridge 104 has not yet been updated.

However, since the ARP request message is transmitted in broadcast mode, the ARP request message reaches even the wireless terminal, which has switched the connecting destination of the access point apparatus. Since the ARP response message from the wireless terminal, which has received the ARP request, is transmitted to the management apparatus 101 via the bridge 104, the bridge 104 can update the forwarding table.

As a result, the bridge 104 can appropriately relay the message to the wireless terminal from the management apparatus 101. As described above, even if the bridge 104 does not have a specific function, the forwarding table can be appropriately updated.

Furthermore, after receiving the ARP response message, the management apparatus 101 executes the PING protocol to confirm whether the important message such as control data for a wireless terminal can reach the wireless terminal. As described above, since the PING command is transmitted after the IP address and the MAC address are deleted from the ARP table, the total processing from transmitting the ARP request message to executing the PING protocol can be performed.

According to the above description, in order to transmit the ARP request message (M305), the management apparatus 101 deletes the IP address and the MAC address, which are to be referred to, in step S406. However, since the ARP request message can be transmitted if only the MAC address is deleted, the IP address may not be deleted.

Further, the management apparatus 101 may transmit a message in broadcast mode to which the broadcast wireless terminal can respond. Therefore, the message may not necessarily be an ARP message. For example, the management apparatus 101 may transmit a Discovery message in broadcast format specifying the IP address of the DVC 105. In this case, the destination information may not be necessarily deleted in step S406.

The first exemplary embodiment describes a case where the management apparatus 101 transmits in broadcast mode a message for allowing the DVC 105 and the display 106 on which the connection switching processing is performed to respond after instructing to switch the connecting destination of the access point apparatus.

Figure 7:
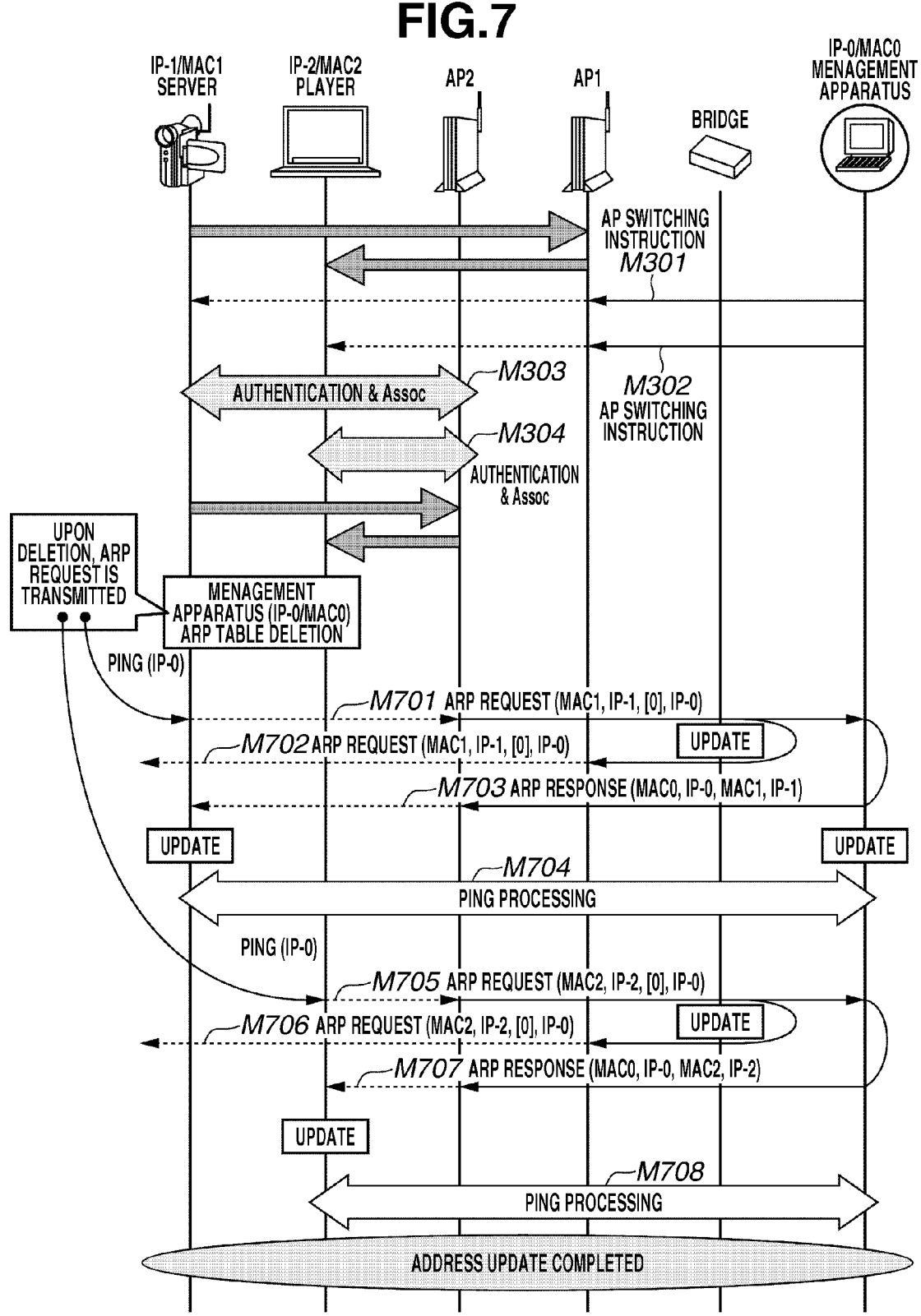
FIG. 7 is a sequence chart illustrating an operation of a communication system according to a second exemplary embodiment of the present invention.

A second exemplary embodiment will describe a case where, after completing the processing for switching connection of the access point apparatus, the DVC 105 and the display 106 autonomously transmit a message to the management apparatus 101, with reference to FIGS. 3, 4, and 7.

FIG. 7 illustrates an example of a sequence chart according to the second exemplary embodiment. Since messages M301, M302, M303, and M304 illustrated in FIG. 7 are similar to those illustrated in FIG. 4, the description thereof will not be repeated.

Further, since the processing of steps S401 to S404 illustrated in FIG. 4 and the processing of steps S501 to S505 illustrated in FIG. 5 are similar to those in the first exemplary embodiment, the description thereof will not be repeated. Hereafter, processing different from the first exemplary embodiment will be mainly described. The processing of M701, M702, M703, M704, M705, M706, M707, and M708 will be performed between the management apparatus 101 and the DVC 105 and between the management apparatus 101 and the display 106. The details will be described all together.

After the switching of the connection to the access point apparatus (2) 103 is completed, then in step S505, the control unit 814 of the DVC 105 and the display 106 monitors reception of the ARP request message in broadcast mode from the management apparatus 101.

If the timer for destination-information confirmation message transmission, which has started in step S503, times out without receiving the ARP request message (YES in step S506), the destination information management unit 812 performs the following processing according to an instruction from the control unit 814.

The destination information management unit 812 copies the IP address of the management apparatus 101 stored in the ARP table in the database 813 to a temporary region of the database 813 using the information access unit 1001.

In step S507, the destination information management unit 812 deletes the MAC address and the IP address of the management apparatus 101 stored in the ARP table in the database 813 using the information access unit 1001.

Next, the destination information management unit 812 performs the transmission processing of the PING command specifying the IP address of the management apparatus 101, which is copied to the temporary region of the database 803.

The destination information management unit 812 transmits the PING command to the wireless network control unit 815 using the message transmission/reception unit 1003. Here, the IP address and the MAC address of the management apparatus 101 are deleted from the referred-to ARP table in step S507. In step S508, the wireless network control unit 815 transmits the ARP request messages (M701, M705) in broadcast mode before executing the PING protocol.

The information elements E602, E603, E604, E605, and E606 included in the destination information 600 constituting the data part of the ARP request message (M701) will be described with reference to FIG. 6. Since the ARP request message is transmitted in broadcast format, the broadcast address is set as the destination MAC address for the head part.

For the information element E602, an identification code indicating that the type of the ARP message is an ARP request is set. For the information element E603, the MAC address (MAC1) of the DVC 105 is set. For the information element E604, the IP address (IP-1) of the DVC 105 is set.

For the information element E605, the destination MAC address is set. However, since the destination MAC address is unknown when the ARP request message is transmitted, the MAC address is not set (0 clear). For the information element E606, the IP address (IP-0) of the management apparatus 101 whose MAC address is inquired is set.

The ARP request message (M705) has the same destination information 600 as that of the ARP request message (M701) except that the MAC address (MAC2) of the display 106 is set for the information element E602 and the IP address (IP-2) of the display 106 is set for the information element E603.

After the ARP request message is transmitted in step S508, then in step S509, the destination information management unit 812 starts the message transmission timer. In steps S510 and S511, the destination information management unit 812 monitors the reception of the ARP response message from the management apparatus 101 until the message transmission timer expires.

Next, the access point apparatus (2) 103, which has received the ARP request message, forwards the ARP request messages (M701, M705) to the bridge 104 connected to the wired LAN side.

The bridge 104 receives the ARP request message (M701, M705) from the access point apparatus (2) 103 connected to the connection port 2.

The bridge 104 updates the forwarding table based on the received ARP request messages (M701, M705). The forwarding table 201 illustrated in FIG. 2 is the one updated by the bridge 104.

The forwarding table 201 indicates that the DVC 105 and the display 106 switch the connection to the access point apparatus (2) 103 so that the MAC addresses of the DVC 105 and the display 106 are registered in the connection port 2. Further, the forwarding table 201 indicates that since the DVC 105 and the display 106, which have been connected to the access point apparatus (1) 102, are removed, the MAC address is not registered in the connection port 1.

Next, the bridge 104 forwards the ARP request messages (M701, M705) to the management apparatus 101 connected to the connection port 0.

Further, the bridge 104 forwards the ARP request messages (M702, M706) to the access point apparatus (1) 102 connected to the connection port 1.

The management apparatus 101 performs the following processing when the ARP request messages (M701, M705) reach the wired network control unit 805 via the message path 821.

When the ARP request messages (M701, M705) are transmitted to the wired network control unit 805, the wired network control unit 805 transfers the ARP request messages to the message transmission/reception unit 904 of the destination information management unit 802. Since the destination MAC address set for the header part of the ARP request message is a broadcast address, the wired network control unit 805 transfers the ARP request message to the message transmission/reception unit 904.

Upon receiving the ARP request messages (M701, M705), the message transmission/reception unit 904 of the destination information management unit 802 transfers the destination information 600 of the ARP request message to the apparatus identification unit 903.

The apparatus identification unit 903 refers to its own IP address stored in the database 803 using the information access unit 901 and compares the destination IP address information E606 to the own IP address.

If the destination IP address information E606 of the ARP request message corresponds to the IP address of the apparatus identification unit 903 (YES in step S404), then in step S414, the destination information management unit 802 stops the timer for destination-information confirmation message transmission.

Next, the destination information management unit 802 generates the ARP response messages (M703, M707) to the DVC 105 and the display 106. Here, the information elements E602, E603, E604, E605, and E606 set for the destination information 600 of the ARP response message (M703) will be described in detail below.

For the information element E602, an identification code indicating that the type of the ARP message is an ARP response is set. For the information element E603, the MAC address (MAC0) of the management apparatus 101 is set. For the information element E604, the IP address (IP-0) of the management apparatus 101 is set.

For the information element E605, the MAC address (MAC1) of the DVC 105 is set. For the information element E606, the IP address (IP-1) of the DVC 105 is set.

The ARP response message (M707) has the same destination information 600 as that of the ARP response message (M703) except that the MAC address (MAC2) of the display 106 is set for the information element E605 and the IP address (IP-2) of the display 106 is set for the information element E606.

The destination information control unit 802 transfers a generated ARP response message to the wired network control unit 805 using the message transmission/reception unit 904.

In step S415, the wired network control unit 805 transmits the ARP response messages (M703, M707) to the access point apparatus (2) 103 via the bridge 104. At this point of time, since the forwarding table of the bridge 104 has been updated, the bridge 104 does not erroneously relay the ARP response message to the access point apparatus (1) 102.

In step S412, the destination information management unit 802 updates the ARP table stored in the database 803 using the information access unit 901.

The access point apparatus (2) 103 forwards the received ARP response messages (M703, M707) to the DVC 105 and the display 106 in wireless connection.

When the ARP response messages (M703, M707) reach the wireless network control unit 815 via the message path 820, the DVC 105 and the display 106 perform the following processing.

When the ARP response messages (M703, M707) are addressed to the wireless network control unit 815, the wireless network control unit 815 transfers the ARP response messages to the message transmission/reception unit 1003 of the destination information management unit 812.

The message transmission/reception unit 1003 of the destination information management unit 812 transfers the destination information 600 of the ARP response message to the apparatus identification unit 1002. The apparatus identification unit 1002 refers to the IP address thereof stored in the database 813 using the information access unit 1001 and compares the destination IP address information E606 with the IP address thereof.

If the destination IP address information E606 of the ARP response message corresponds to the IP address of the apparatus identification unit 1002 (YES in step S511), then in step S512, the destination information management unit 812 stops the message transmission timer. In step S513, the destination information management unit 812 updates the ARP table stored in the database 813 using the information access unit 1001.

After the ARP table is updated, the wireless network control unit 815 refers to the ARP table stored in the database 813 using the information access unit 1001 and performs the PING protocol message processing (M704, M708).

At this point, since the forwarding table managed by the bridge 104 has been updated, the PING command transmitted by the DVC 105 and the display 106 reaches the management apparatus 101. Then, a response is transmitted back to the DVC 105 and the display 106. As a result, the communications of the network between the DVC 105 and the management apparatus 101 and between the display 106 and the management apparatus 101 can be confirmed.

If the DVC 105 and the display 106 can receive the ARP response message from the management apparatus 101, the communications of the network between the DVC 105 and the management apparatus 101 and between the display 106 and the management apparatus 101 can be confirmed. Therefore, in that case, the PING protocol message processing (M308, M312) may be omitted.

If the message transmission timer times out without receiving the ARP response message having the destination of the DVC 105 or the display 106 (YES in step S510), then in step S514, the management apparatus 101 determines whether the number of times of time out reaches a predetermined number of times. If the number of times of time out is within the predetermined number (NO in step S514), the process returns to step S508 to resend the ARP request message. If the number of times of time out exceeds the predetermined number (YES in step S514), the processing ends.

According to the sequence illustrated in FIG. 7, after the processing (M701, M702, M703, M704) is performed between the management apparatus 101 and the DVC 105, the processing (M705, M706, M707, M708) is performed between the management apparatus 101 and the display 106. However, whichever processing may be performed first.

As described above, according to the present exemplary embodiment, a wireless terminal receiving an instruction for switching the connecting destination of the access point apparatus from the management apparatus 101 autonomously transmits the ARP request message upon completing to switch the connection. At the point when the wireless terminal switches the connecting destination of the access point apparatus, the forwarding table managed by the bridge 104 has not yet been updated.

However, when relaying the ARP request message from the wireless terminal to the management apparatus 101, the bridge 104 can update the forwarding table. As a result, the bridge 104 can appropriately relay the ARP response message and other important messages to the wireless terminal from the management apparatus 101. As described above, even if the bridge 104 does not have a specific function, the forwarding table can be appropriately updated.

According to the description above, the DVC 105 and the display 106 delete the referred-to destination information in step S507 in order to transmit the ARP request messages (M701, M705). However, the DVC 105 and the display 106 may transmit the message that can be received by the management apparatus 101, and not necessarily be the broadcast message such as the ARP request message. For example, a message notifying that switching the connecting destination of the access point has been completed may be transmitted to the management apparatus 101 in unicast mode.

A message such as an ARP request message is transmitted in broadcast mode to be forwarded also to an access point apparatus to which the wireless terminal has been connected. Thus, the access point apparatus can also recognize that connection switching has been completed.

Further, a message that can be responded to by the management apparatus 101, such as an ARP request message, may be transmitted to the management apparatus in unicast mode. With this arrangement, updating the forwarding table by the bridge 104 and confirmation of the communication between the management apparatus 101 and the bridge 104 can be additionally performed. In this case, the destination information may not be deleted in step S507.

The first exemplary embodiment is described with the assumption that, when the management apparatus cannot receive the ARP request message from the wireless terminal (NO in step S404, YES in step S405), the management apparatus transmits the ARP request message.

Further, the second exemplary embodiment is described with the assumption that, when the wireless terminal cannot receive the ARP request message from the management apparatus (NO in step S505, YES in step S506), the wireless terminal transmits the ARP request message. However, the management apparatus and the wireless terminal may transmit the ARP request message without determining whether to receive the ARP message.

More specifically, according to the first exemplary embodiment, the management apparatus omits the determination in steps S404 and S405 and performs the processing in step S406 and subsequent steps. When receiving the ARP request in step S505, the wireless terminal performs the processing in step S515 and subsequent steps. When the processing times out in step S506, the wireless terminal ends the processing without performing the processing in step S507 and subsequent steps.

According to the second exemplary embodiment, when receiving the ARP requirement in step S404, the management apparatus performs the processing in step S414 and subsequent steps. When the processing times out in step S405, the management apparatus ends the processing without performing the processing in step S406 and subsequent steps. The wireless terminal omits the determination in steps S505 and S506 and performs the processing in step S507.

Each of the above exemplary embodiments describes the case where a single bridge is used. However, the present invention can be also applied when a plurality of relay apparatuses, such as bridges, are used between the management apparatus and the access point apparatus.

Further, each of the above exemplary embodiments describe the cases where the 802.11 wireless LAN is used. However, the present invention can be also applied for other wireless medium, such as a wireless universal serial bus (USB), Multiband Orthogonal Frequency Division Multiplexing Alliance (MBOA), Bluetooth (registered trade mark), ultra wideband (UWB), and ZigBee. The UWB includes a wireless USB, wireless 1394, and WINET.

As described above, according to an exemplary embodiment, even when the connecting destination of the access point of a wireless terminal is switched in response to an instruction from the management apparatus, the forwarding table of the bridge, which is a relay apparatus, can be instantly updated. Further, the relay apparatus does not need to perform specific control, and commercially-available products can be used, thus easily establishing the system.

According to an exemplary embodiment of the present invention, a storage medium storing program code of software for realizing the function of the above-described exemplary embodiment can be supplied to a system or an apparatus.

Accordingly, a computer (or a central processing unit (CPU) or a micro processing unit (MPU)) of the system or the apparatus reads out and executes the program code stored in the storage medium so that the present invention can be achieved.

In this case, the program code itself read out from the storage medium realizes the function of the above-described exemplary embodiment so that the storage medium storing the program code constitutes the present invention.

The storage medium for supplying the program code may include, for example, a floppy disk, a hard disk, an optical disk, an optical magnetic disk, a compact disk read only memory (CD-ROM), a CD-recordable, a magnetic tape, a non-volatile memory card, a ROM, and a digital versatile disk (DVD).

Further, the program code read out by the computer is executed so that the function of an example of the exemplary embodiments as described above is realized. Further, based on the instruction of the program code, an operating system (OS) running on the computer performs a part of or all of the actual processing. The present invention includes a case where the processing realizes the function of the above-described exemplary embodiment.

Further, the program code read out from the storage medium can be written in a memory provided in a function extension board inserted into the computer or a function extension unit connected to the computer.

Based on the instruction of the program code, the CPU provided in the function extension board or the function extension unit can perform a part of or all of the actual processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-197967 filed Jul. 31, 2008, which is hereby incorporated by reference herein in its entirety.

What is claimed is:

1. A communication system comprising:
   a wireless terminal configured to establish a wireless connection with a plurality of base stations;
   a management apparatus including:
      a first controller configured to send a switching instruction to the wireless terminal via at least one of the plurality of base stations; and
      a destination information manager configured to transmit in a broadcast mode a request message including a destination of the wireless terminal; and
   a relay apparatus configured to relay communication between the plurality of base stations and the management apparatus, the relay apparatus including a storage device configured to store information used to determine a forwarding destination of a received message,
   wherein the wireless terminal includes a second controller configured to switch the wireless connection from the at least one of the plurality of base stations to another one of the plurality of base stations based on the switching instruction received from the first controller, and to transmit a response message to the relay apparatus to update the information stored by the storage device in a case that the second controller completes switching of the wireless connection, and
   wherein the relay apparatus is further configured to update the information stored by the storage device based on the response message transmitted from the wireless terminal, and
   wherein the second controller of the wireless terminal transmits the response message in response to the request message.

2. The communication system according to claim 1, wherein the request message includes an Address Resolution Protocol (ARP) request message.

3. The communication system according to claim 2,
   wherein the destination information manager of the management apparatus is further configured to manage an Internet Protocol (IP) address and a Media Access Control (MAC) address of the wireless terminal in association with each other and to delete the MAC address of the wireless terminal based on the switching instruction to switch the wireless connection among MAC addresses, and
   wherein the destination information manager transmits the ARP request message to the wireless terminal and confirms switching of the wireless connection based on the switching instruction after the destination information manager deletes the MAC address by performing transmission processing on a Packet Internet Groper (PING) command.

4. The communication system according to claim 1, wherein the destination information manager is further configured to receive from the wireless terminal the response message in response to the request message, and the first controller is further configured to execute a Packet Internet Groper (PING) protocol on the wireless terminal in response to the response message.

5. The communication system according to claim 1, wherein the second controller transmits the response message to the management apparatus in response to completion of switching of the wireless connection by the second controller.

6. The communication system according to claim 5, wherein the response message includes a notification that the second controller has completed switching.

7. The communication system according to claim 1,
   wherein the management apparatus is configured to manage wireless resources in the plurality of base stations, and
   wherein the first controller sends the switching instruction to the wireless terminal via the at least one of the plurality of base stations based on a usage state of wireless resources in the at least one of the plurality of base stations.

8. A management apparatus in a communication system comprising a wireless terminal configured to establish a wireless connection with a plurality of base stations, the plurality of base stations including a first base station and a second base station, and a relay apparatus configured to relay communication between the plurality of base stations and the management apparatus, the management apparatus comprising:
   a controller configured to send a switching instruction to the wireless terminal to switch the wireless connection from the first base station to the second base station via the first base station; and
   a destination information manager configured to transmit in a broadcast mode a request message including a destination of the wireless terminal, and to receive from the wireless terminal a response message in response to the request message via the relay apparatus, the response message causing the relay apparatus to update stored information used to determine a forwarding destination of a received message in a case that the wireless terminal completes switching of the wireless connection from the first base station to the second base station based on the switching instruction.

9. A non-transitory storage medium storing a computer-executable program for causing a computer to execute a method of operating a management apparatus in a communication system comprising a wireless terminal configured to establish a wireless connection with a plurality of base stations, the plurality of base stations including a first base station and a second base station, and a relay apparatus configured to relay communication between the plurality of base stations and the management apparatus, the method comprising:

sending a switching instruction from the management apparatus to the wireless terminal to switch the wireless connection from the first base station to the second base station via the first base station;

transmitting, from the management apparatus, in a broadcast mode a request message including a destination of the wireless terminal; and receiving, at the management apparatus, a response message from the wireless terminal in response to the request message via the relay apparatus, the response message causing the relay apparatus to update stored information used to determine a forwarding destination of a received message in a case that the wireless terminal completes switching of the wireless connection from the first base station to the second base station based on the switching instruction.

10. A method for controlling a communication system comprising a wireless terminal configured to establish a wireless connection with a plurality of base stations, a management apparatus, and a relay apparatus configured to relay communication between the plurality of base stations and the management apparatus, the method comprising:

sending a switching instruction from the management apparatus to the wireless terminal via at least one of the plurality of base stations;

transmitting, from the management apparatus, in a broadcast mode a request message including a switching destination of the wireless terminal;

storing in the relay apparatus information used to determine a forwarding destination of a received message;

switching, at the wireless terminal, the wireless connection from the at least one of the plurality of base stations to another one of the plurality of base stations based on the switching instruction;

transmitting a response message from the wireless terminal to the relay apparatus to update the stored information in a case that switching the wireless connection is completed; and updating in the relay apparatus the stored information based on the response message, and wherein the wireless terminal transmits the response message in response to the request message.

11. A wireless terminal in a communication system comprising a management apparatus, a plurality of base stations configured to establish a wireless connection with the wireless terminal, and a relay apparatus configured to relay communication between the plurality of base stations and the management apparatus, the wireless terminal comprising:

a receiver configured to receive a switching instruction from the management apparatus via at least one of the plurality of base stations;

a controller configured to switch the wireless connection from the at least one of the plurality of base stations to another one of the plurality of base stations based on the switching instruction;

the receiver configured to receive a request message transmitted in a broadcast mode by the management apparatus, the request message including a destination of the wireless terminal; and a transmitter configured to transmit a response message to the relay apparatus to update stored information used to determine a forwarding destination of a received message in a case that the controller completes switching of the wireless connection from the at least one of the plurality of base stations to the another one of the plurality of base stations, wherein the transmitter transmits the response message in response to the request message.

12. A non-transitory storage medium storing a computer-executable program for causing a computer to execute a method of operating a wireless terminal in a communication system comprising a management apparatus, a plurality of base stations configured to establish a wireless connection with the wireless terminal, and a relay apparatus configured to relay communication between the plurality of base stations, the method comprising:

receiving, at the wireless terminal, a switching instruction from the management apparatus via at least one of the plurality of base stations;

switching, at the wireless terminal, the wireless connection from the at least one of the plurality of base stations to another one of the plurality of base stations based on the switching instruction;

receiving, at the wireless terminal, a request message transmitted in a broadcast mode by the management apparatus, the request message including a destination of the wireless terminal; and transmitting a response message from the wireless terminal to the relay apparatus to update stored information used to determine a forwarding destination of a received message in a case that switching of the wireless connection from the at least one of the plurality of base stations to the another one of the plurality of base stations is completed, in response to the request message, wherein transmitting the response message is in response to the request message.

13. A method for controlling a management apparatus in a communication system comprising a wireless terminal configured to establish a wireless connection with a plurality of base stations, the plurality of base stations including a first base station and a second base station, and a relay apparatus configured to relay communication between the plurality of base stations and the management apparatus, the method comprising:

sending a switching instruction from the management apparatus to the wireless terminal to switch the wireless connection from the first base station to the second base station via the first base station;

transmitting, from the management apparatus, in a broadcast mode a request message including a destination of the wireless terminal; and receiving, at the management apparatus, a response message from the wireless terminal via the relay apparatus in response to the request message, the response message causing the relay apparatus to update stored information used to determine a forwarding destination of a received message in a case that the wireless terminal completes switching of the wireless connection from the first base station to the second base station based on the switching instruction.

* * * * *